3,555,102
METHOD FOR PRODUCING A VINYL FLUORIDE

Eiji Ogura, Onoda, Kiyotada Hatabu, Ube, and Nobuki Nomura, Onoda, Japan, assignors to Onoda Cement Company, Limited, Yamaguchi Prefecture, Japan
No Drawing. Filed Apr. 16, 1969, Ser. No. 816,814
Claims priority, application Japan, May 8, 1968, 43/30,255
Int. Cl. C07c 17/08, 21/18
U.S. Cl. 260—653.4                                      7 Claims

ABSTRACT OF THE DISCLOSURE

This invention relates to an improved catalyst usable for producing vinyl fluoride and a method of producing vinyl fluoride by using such an improved catalyst. The catalyst is comprised of a porous carrier which is impregnated with at least one member selected from mercuric compounds and at least one member selected from inorganic compounds of Pb, Sn, Cd and Zn. The vinyl fluoride is produced by the reaction of acetylene and hydrogen fluoride in the presence of the above catalyst.

---

This invention relates to an improved catalyst which can be used for producing a monomer of vinyl fluoride by the reaction of acetylene and hydrogen fluoride.

Heretofore, there were proposed many catalysts in the art for producing vinyl fluoride by reacting acetylene with hydrogen fluoride in the gas phase. For example, there were proposed certain catalysts comprising charcoal, graphite or an alkaline earth metal as a carrier which is incorporated with a mercuric compound such as mercuric chloride, mercuric fluoride, mercuric nitrate, mercuric acetate or mercuric oxide or mercuric oxide partially bonded to a nitrogen oxide. These catalysts, however, are found to have such defects in that they are rapidly deactivated during reaction; they produce a large amount of tar and they have the tendency to form a solid mass. The Japanese patent publication No. 16,522 published in the year 1965 discloses that the activity of the mercury-charcoal type catalyst deteriorates to a 50% of its original activity during the reaction for 12 to 16 hours. Other catalysts comprising some zinc compounds or some cadmium compound are known in the art but they have low activity at low reaction temperatures and can not be expected to give the high conversion rate of acetylene, and therefore, it is required to use them at a high temperature of 250–400° C. for obtaining the high conversion rate of acetylene but their life is reduced remarkably at such a high temperature.

The inventors have searched for some catalysts usable for producing vinyl fluoride and have found certain catalysts which can be used for producing vinyl fluoride by reacting acetylene with hydrogen fluoride in the gas phase and also the inventors have found that such catalysts have high activity at low reaction temperatures and they can maintain their activity for a prolonged period of time with less formation of by-products such as tar and with high conversion rate of vinyl fluoride.

This invention, therefore provides catalysts comprising at least one of mercuric compounds and at least one of inorganic compounds of Pb, Sn, Cd and Zn as the catalytic component for producing vinyl fluoride by using a gaseous mixture of acetylene and hydrogen fluoride.

In a preferred embodiment of this invention, it is preferable to use a porous carrier such as active carbon, charcoal, graphite, alumina, chloride of Al, Cr, Mg, Ca or Ba, oxychloride of Al, Cr, Mg, Ca or Ba, or fluoride of Al, Cr, Mg, Ca or Ba.

Mercuric compounds used in this invention include mercuric chloride, mercuric fluoride, mercuric nitrate, mercuric acetate and mercuric oxide.

Inorganic compounds of Pb, Sn, Cd and Zn used in this invention include $PbCl_2$, $PbF_2$, $Pb(OH)_2$, $PbSO_4$, $Pb(NO_3)_2$, $Pb_3O_4$, PbO, $SnCl_4$, $SnF_4$, $Sn(SO_4)_2$, $SnO_2$, $SnOCl_2$, $CdCl_2$, $CdF_2$, $Cd(OH)_2$, $Cd(NO_3)_2$, $CdSO_4$, CdO, $ZnCl_2$, $ZnF_2$, $Zn(OH)_2$, $Zn(NO_3)_2$, $ZnSO_4$ and ZnO, and it is noted that at least one of them can be used.

The catalysts used in this invention can be prepared by impregnating the carrier with the mercuric compound in an amount of 3 to 30% by weight of said carrier calculated at HgO by weight, and in addition, impregnating the carrier with the inorganic compound of Pb, Sn, Cd or Zn in an amount of 25 to 200% calculated as an oxide of Pb, Sn, Cd or Zn by weight of the mercuric compound calculated as HgO by weight.

In the preparation of the above catalysts, an insoluble inorganic compound can be adhered to or impregnated on the carrier by applying an aqueous suspension of the insoluble inorganic compound to said carrier or the insoluble inorganic compound may be adsorbed into the carrier by any conventional procedure after the insoluble inorganic compound is converted into a soluble salt by treating it with an acid.

The catalyst may be heated at a temperature of 30 to 300° C. in the current atmosphere containing a hydrogen fluoride gas diluted with an inert gas such as nitrogen or the like before it is used. The hydrogen fluoride contained in the atmosphere is used in an amount of 10 to 40 mol times the amount of the metal compound contained in the catalyst. If such a pre-treatment is not applied to the catalyst before it is used, the catalyst reacts with or adsorbs the hydrogen fluoride contained in the starting gaseous raw mixture immediately after the reaction occurs, and causes a deficiency in hydrogen fluoride or a surplus of acetylene to the starting gaseous raw mixture until the reaction reaches the equilibrium state and therefore, the gaseous phase contains an excess of unreacted acetylene which is carbonized or converted into a tarry substance which accelerates the deterioration of the catalyst. In addition, when the catalyst is prepared by using a chloride of Hg, Pb, Sn, Cd or Zn and also is not pre-treated as in the manner mentioned above, it is impossible to avoid the undesirable phenomenon of the temporary formation of vinyl chloride in the initial step of the reaction.

It is preferable to use the catalysts of this invention at a temperature of 25° C. to 250° C. in order that they maintain their catalytic activity for a prolonged period of time. When the catalysts are used at a temperature of below 25° C., hydrogen fluoride tends to condense onto them and also when the condensed hydrogen fluoride contacts an acetylene gas, the acetylene gas tends to carbonize or convert into tarry substance, and hence the catalytic activity of the catalysts is reduced and the bed of catalyst is clogged with cake or tarry substance. On the contrary, when the catalysts are used at a temperature of above 250° C., the carbonization or conversion of the acetylene gas is highly accelerated. It is, therefore, generally preferable to use a temperature of 30° C. to 80° C.

The mol ratio of hydrogen fluoride to acetylene ($HF/C_2H_2$) is 1 to 5, and preferably 1 to 2. It is unfavorable to use a mol ratio of below 1 because the unreacted acetylene remains in the reaction zone and also it is unfavorable to use a mol ratio of above 5 because it is necessary to recover a large amount of hydrogen fluoride. It is preferable to feed a mixture of hydrogen fluoride and acetylene to the catalyst at the passing speed of 20 to 1,000 liters per liter of catalyst per hour. When a passing speed of above 1,000 is used, the conversion rate of acetylene is remarkably reduced and simultaneously the life of catalyst is shortened. Also, when the passing speed of below 20 is used, the economical merits of this invention cannot be achieved.

This invention is illustrated by the following examples. As illustrated in examples, it is recognized that the catalysts of this invention have high activity for producing vinyl fluoride and can be used for a prolonged period of time with maintaining their activity. It should be noted that the parts referred to in the examples are parts by weight.

EXAMPLE 1

100 parts of granular active carbon were treated with an aqueous solution containing mercuric nitrate and cadmium nitrate thereby to contain 12 parts of mercuric nitrate and 11.3 parts of cadmium nitrate, and then the impregnated granular active carbon was dried to produce a catalyst.

86.9 grams of the catalyst were charged into a nickel made, vertical tubular reactor the size of 2 cm. in inner-diameter and 70 cm. in length. The bed of catalyst was measured to have 60 cm. in height. The reactor was heated to 200° C. and the catalyst was pre-treated with a mixture of 75 mol percent hydrogen fluoride diluted with nitrogen, at this temperature, by feeding the diluted hydrogen fluoride at the rate of 107 liters per hour for 2 hours, and then the reactor was allowed to stand until the temperature was lowered to 50° C. Maintaining the reactor at this temperature, a gaseous mixture containing hydrogen fluoride and acetylene in the mol ratio of 1.5 of $HF/C_2H_2$ was fed at the top of the reactor at the feeding rate of 150 liters per liter of catalyst per hour for producing vinyl fluoride. The resultant gaseous mixture was washed with an alkaline solution to remove unreacted hydrogen fluoride and then the gaseous mixture was analyzed with a gas chromatograph. The results of analysis are listed below.

|  | After an elapsed time of 9 hrs., mol percent | After an elapsed time of 132 hrs., mol percent |
| --- | --- | --- |
| Vinyl fluoride | 98.8 | 90.5 |
| 1,1-difluoroethane | 1.2 | 0.7 |
| Acetylene | Trace | 8.8 |

EXAMPLE 2

100 parts of active carbon were impregnated with an aqueous solution containing mercuric chloride and cadmium sulfate thereby to contain 10 parts of mercuric chloride and 10 parts of cadmium sulfate, and then the impregnated active carbon was dried to produce a catalyst.

The catalyst was charged into a nickel made, tubular reactor having the size of 2 cm. in inner-diameter and 40 cm. in length. The bed of catalyst was measured to have 30 cm. in height. The catalyst was pre-treated in the same manner as in Example 1. The reactor was maintained at 50° C. and then a gas mixture containing hydrogen fluoride and acetylene in the mol ratio of 2 of $HF/C_2H_2$ was fed at the top of the reactor at the feeding rate of 112 liters per liter of catalyst per hour for producing vinyl fluoride. The resultant gaseous mixture was analyzed and the composition is given as follows.

|  | After an elapsed time of 4.5 hrs., mol percent | After an elapsed time of 227 hrs., mol percent |
| --- | --- | --- |
| Vinyl fluoride | 77.5 | 87.6 |
| 1,1-difluoroethane | 0.2 | 3.1 |
| Acetylene | 1.8 | 9.3 |
| Vinyl chloride | 20.5 | 0.0 |

This example shows that the catalyst has high activity and also it was observed that the catalyst is not agglomerated by the action of by-product such as a tarry substance after it was used for 227 hours.

COMPARATIVE EXAMPLE 1

100 parts of active carbon were treated with an aqueous solution containing mercuric chloride thereby to contain 10 parts of mercuric chloride and then the impregnated active carbon was dried to produce a catalyst.

The catalyst was used by repeating the method as disclosed in Example 2. The resultant gaseous mixture was analyzed and the composition is given as follows.

|  | After an elapsed time of 6 hrs., mol percent | After an elapsed time of 20 hrs., mol percent |
| --- | --- | --- |
| Vinyl fluoride | 95.1 | 59.0 |
| 1,1-difluoroethane | 3.7 | 3.9 |
| Acetylene | 0.5 | 37.1 |
| Vinyl chloride | 0.7 | 0.0 |

This example shows that the catalyst comprising the mercuric chloride alone has reduced catalytic activity after a short time and comparison of the activity of this catalyst may be made with that of the catalyst used in Example 2.

COMPARATIVE EXAMPLE 2

100 parts of active carbon were impregnated with an aqueous solution containing cadmium nitrate thereby to contain 11.3 parts of cadmium nitrate and the impregnated active carbon was dried to produce a catalyst.

Also, 100 parts of active carbon were treated with an aqueous solution containing zinc chloride thereby to contain 10 parts of zinc chloride and the impregnated active carbon was dried to produce a catalyst.

Example 1 was repeated by using each of the above two catalysts in the same manner as in Example 1 except that the mol ratio of hydrogen fluoride to acetylene was 2 and the feeding rate of gaseous mixture was 200 liters per liter of catalyst per hour. The reaction was carried out for 3 hours and the resultant gaseous mixture was analyzed as follows.

|  | Cadmium nitrate is used, mol percent | Zinc chloride is used, mol percent |
| --- | --- | --- |
| Vinyl fluoride | 14.2 | 17.6 |
| 1,1-difluoroethane | 1.7 | 2.3 |
| Acetylene | 84.1 | 80.1 |

This comparative example shows that the catalysts have low activity at the low temperature of 50° C. as they are high temperature type catalysts. The catalyst comprising cadmium nitrate may be compared with the catalyst used in Example 1, and also the catalyst comprising zinc chloride may be compared with the catalyst as illustrated in the following Example 3.

EXAMPLE 3

100 parts of active carbon were treated with an aqueous solution containing mercuric chloride and zinc chloride thereby to contain 10 parts of mercuric chloride and 10 parts of zinc chloirde, and then the impregnated active carbon was dried to produce a catalyst.

Example 1 was repeated by using the catalyst in the same manner as in Example 1 with except that the mol ratio of hydrogen fluoride to acetylene was 2 and the feeding rate of gaseous mixture was 200 liters per liter of catalyst per hour. The resultant gaseous mixture was analyzed as follows.

|  | After an elasped time of 3 hrs., mol percent | After an elapsed time of 66 hrs., mol percent |
| --- | --- | --- |
| Vinyl fluoride | 85.4 | 91.3 |
| 1,1-difluoroethane | 9.7 | 0.8 |
| Acetylene | Trace | 7.9 |
| Vinyl chloride | 4.9 | 0.0 |

EXAMPLE 4

100 parts of active carbon were treated with an aqueous solution containing mercuric nitrate and lead nitrate thereby to contain 12 parts of mercuric nitrate and 15.9 parts of lead nitrate, and then the impregnated active carbon was dried to produce a catalyst.

Example 3 was repeated by using the catalyst in the same manner as in Example 3. The resultant gaseous mixture was analyzed as follows.

|  | After an elapsed time of 9 hrs., mol percent | After an elapsed time of 102 hrs. mol percent |
|---|---|---|
| Vinyl fluoride | 96.9 | 93.3 |
| 1,1-difluoroethane | 3.1 | 0.9 |
| Acetylene | Trace | 5.8 |

What we claim is that:

1. A method for producing vinyl fluoride, which comprises reacting acetylene with hydrogen fluoride in the gaseous state in the presence of a catalyst consisting essentially of a carrier of active carbon or charcoal incorporated with at least one mercuric compound selected from the group consisting of mercuric chloride, mercuric fluoride, mercuric nitrate, mercuric acetate and mercuric oxide, and at least one inorganic compound selected from the group consisting of $PbCl_2$, $PbF_2$, $Pb(OH)_2$, $PbSO_4$, $Pb(NO_3)_2$, $Pb_3O_4$, $PbO$, $SnCl_4$, $Sn(SO_4)_2$, $SnF_4$, $SnO_2$, $SnOCl_2$, $CdCl_2$, $CdF_2$, $Cd(OH)_2$, $Cd(NO_3)_2$, $CdSO_4$, $CdO$, $ZnCl_2$, $ZnF_2$, $Zn(OH)_2$, $Zn(NO_3)_2$, $ZnSO_4$ and $ZnO$.

2. The method of producing vinyl fluoride according to claim 1, wherein the porous carrier is impregnated with mercuric compound in an amount of 3 to 30% by weight of said carrier calculated as HgO by weight.

3. The method of producing vinyl fluoride according to claim 1, wherein the porous carrier is impregnated with at least one inorganic compound of Pb, Sn, Cd or Zn in an amount of 25 to 200% calculated as metal oxide by weight of the mercuric compound calculated as HgO by weight.

4. The method of producing vinyl fluoride according to claim 1, wherein the metal chloride-containing catalyst is pre-treated at a temperature of 30 to 300° C. by passing hydrogen fluoride through said catalyst before it is used.

5. The method of producing vinyl fluoride according to claim 1, wherein the acetylene gas is reacted with the hydrogen fluoride gas at a temperature of catalyst ranging from 25° C. to 250° C.

6. The method of producing vinyl fluoride according to claim 1, wherein the mol ratio of hydrogen fluoride to acetylene is varied from 1 to 5.

7. The method of producing vinyl fluoride according to claim 1, wherein the gaseous mixture of hydrogen fluoride and acetylene is fed at a passing speed of 20 to 1,000 liters per liter of catalyst per hour.

References Cited

UNITED STATES PATENTS

| 2,401,850 | 6/1946 | Whitman | 260—653.4 |
| 2,634,300 | 4/1953 | Hillyer et al. | 260—653.4 |

DANIEL D. HORWITZ, Primary Examiner

U.S. Cl. X.R.

260—653.6; 252—441, 440, 431, 475